United States Patent
Fried et al.

(10) Patent No.: US 8,670,556 B2
(45) Date of Patent: Mar. 11, 2014

(54) MULTI-PARTICIPANT COMMUNICATION SYSTEM WITH AUDIO MANAGER RESPONSIVE TO MODE CHANGE REQUESTS

(75) Inventors: Eric P Fried, Austin, TX (US); Priyanka Jade, Bangalore (IN); Suresh Sabarathinam, Bangalore (IN); Silpa Kosanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 12/830,879

(22) Filed: Jul. 6, 2010

(65) Prior Publication Data

US 2012/0008757 A1   Jan. 12, 2012

(51) Int. Cl.
*H04M 1/00*   (2006.01)
(52) U.S. Cl.
USPC ....... 379/420.01; 379/219; 455/419; 455/420
(58) Field of Classification Search
USPC ............... 379/201.01, 202.01, 219, 418, 419, 379/420.01, 421; 455/419, 420
See application file for complete search history.

(56) References Cited

U.S. PATENT DOCUMENTS

| | | | |
|---|---|---|---|
| 5,390,341 A | | 2/1995 | Ziniel |
| 6,212,238 B1 | | 4/2001 | Chambers |
| 6,351,639 B1 | * | 2/2002 | Motohashi .................... 455/420 |
| 6,795,544 B1 | * | 9/2004 | D'Arcy et al. ................ 379/219 |
| 7,336,649 B1 | | 2/2008 | Huang |
| 2003/0050720 A1 | | 3/2003 | Kolessar |
| 2006/0099970 A1 | * | 5/2006 | Morgan et al. ............. 455/456.6 |
| 2006/0126866 A1 | | 6/2006 | Falcon |
| 2006/0132595 A1 | | 6/2006 | Kenoyer |
| 2007/0173212 A1 | | 7/2007 | Mergler |
| 2009/0097625 A1 | | 4/2009 | Peters |

OTHER PUBLICATIONS

Clarity—"RC100 + RC200 Remote Control Speakerphone", Plantronics (2002).

* cited by examiner

*Primary Examiner* — Oleg Asanbayev
(74) *Attorney, Agent, or Firm* — David Mims; Mark P Kahler (57) ABSTRACT

A communication system includes a local communication device that communicates with a remote communication device via a wired or wireless communication link between the devices. The local communication device and the remote communication device are each capable of switching between a multiple user mode and a single user private mode in response to a mode change request. The local and remote communication devices include respective profiles that include profile attributes that define how the respective communication device responds to a mode change request. A user of one communication device may send a mode change request to the other communication device. In response to the mode change request, the other communication device changes mode between multiple participant mode and single participant mode if the profile of that communication device permits the mode change.

6 Claims, 5 Drawing Sheets

MULTI-PARTICIPANT COMMUNICATION SYSTEM WITH AUDIO MANAGER RESPONSIVE TO MODE CHANGE REQUESTS

BACKGROUND

The disclosures herein relate generally to information handling systems (IHSs), and more specifically, to audio communication between users of information handling systems.

Audio teleconferencing systems are commonplace in today's business world and the consumer market as well. These teleconferencing systems, also know as "speaker-phone" systems, provide a way for several participants to hear and participate in a conversation. Some speaker-phone systems employ a dedicated handset, while some handset-based units integrate a speaker-phone capability. In this manner, participants local to the system may jointly participate in a conversation with a remote or far-end user.

BRIEF SUMMARY

In one embodiment, a communication method is disclosed that includes transmitting, by a first communication device, audio information to a second communication device that is remote with respect to the first communication device, the first and second communication devices each being capable of switching between a multiple user communication mode and a single user private mode in response to a mode change request. The method also includes storing, by the first and second communication devices, respective user-selected profile attributes that control responses of the first and second communication devices to mode change requests.

In another embodiment, a communication system is disclosed. The communication system includes a first communication device that is capable of switching between a multiple user communication mode and a single user private mode in response to a mode change request. The communication system also includes a second communication device that is capable of switching between a multiple user communication mode and a single user private mode in response to a mode change request from the first communication device. The first communication device includes a first profile that includes a user-selected profile attribute that controls responses of the first communication device to mode change requests from the second communication device. The second communication device includes a second profile that includes a user-selected profile attribute that controls responses of the second communication device to mode change requests from the first communication device.

In yet another embodiment, a computer program product is disclosed. The computer program product includes a computer readable storage medium. The computer program product includes first program instructions that transmit audio information from a first communication device to a second communication device that is remote with respect to the first communication device, the first and second communication devices each being capable of switching between a multiple user communication mode and a single user private mode in response to a mode change request. The computer program product also includes second program instructions that store, in the first and second communication devices, respective user-selected profile attributes that control responses of the first and second communication devices to mode change requests. The first and second program instructions are stored on the computer readable storage medium.

BRIEF DESCRIPTION OF THE DRAWINGS

The appended drawings illustrate only exemplary embodiments of the invention and therefore do not limit its scope because the inventive concepts lend themselves to other equally effective embodiments.

DETAILED DESCRIPTION

Communications devices such as speaker-phones allow multiple participants at a local-end of a call to engage in a conversation with multiple participants at a far-end of the call. A speaker-phone may include an attached handset that enables a particular participant at a local-end to hear a private communication from a participant at the far-end. However, switching from a multi-participant mode to a single-participant private mode at one end is a manual and somewhat cumbersome process. For example, a participant at one end may instruct a particular participant at the other end to pick up the handset so that only the particular participant may hear. In another example, a participant at one end may instruct a particular participant at the other end to switch the communication device from single participant private mode (e.g. handset mode) to multi-participant mode (e.g. speaker-phone mode) so that all participants can hear.

The disclosed communication system includes a local communication device and a remote communication device that communicate with one another via a wired or wireless link between the devices. The local communication device includes an audio manager that enables a participant using the local communication device to view and control audio mode settings not only for the local communication device, but to also view and control the audio mode setting of the remote communication device, provided certain conditions are met. The remote communication device includes an audio manager with similar capabilities. In one embodiment, a user of the local communication device with audio manager may instruct the remote communication device with audio manager to switch from multi-participant mode, wherein multiple participants may listen, to single participant mode so that a particular single participant may listen privately. These and other features provided by the disclosed audio manager are discussed in more detail below.

Figure 1:
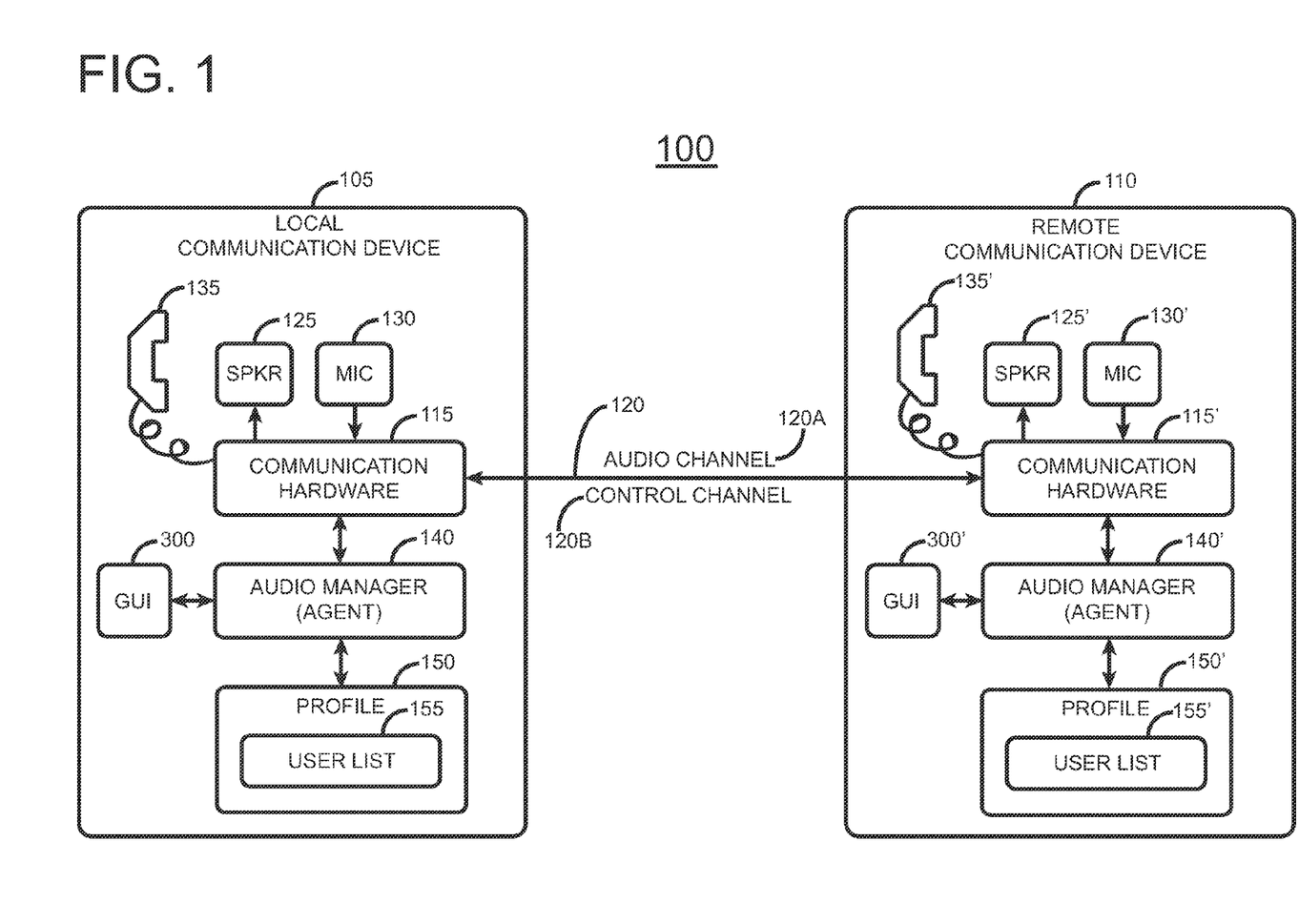
FIG. 1 shows a block diagram of one embodiment of the disclosed communication system with an audio manager.

FIG. 1 shows a block diagram of one embodiment of the disclosed communication system 100 including a local communication device 105 and a remote communication device 110. Local communication device 105 may also be called the local-end communication device. Remote communication device 110 may also be called the remote-end communication device. The term "remote" here is used to mean that remote communication device 110 is sufficiently far away from local communication device 105 that users of remote communication device 110 do not hear audio travelling acoustically through the air from local communication device 105.

Local communication device 105 includes communication hardware 115 that couples via communication link 120 to remote communication device 110. Communication link 120 may support either wire or wireless transmission of information between communication devices 105 and 110. More particularly, communication hardware 115 and 115' may communicate with one another via a wired communication link 120 that employs Ethernet, Voice Over Internet Protocol (VOIP), optical, twisted pair or other wire-based communications mechanisms. Communication hardware 115 and 115' may also communicate wirelessly with one another via a wireless communication link 120 via IEEE 802.11 protocols, mobile phone protocols and other wireless signaling protocols, depending on the particular application. Communication link 120 includes an audio channel 120A for communicating audio information and a control channel 120B for communicating control information between communication devices 105 and 110. In actual practice, audio channel 120A and control channel 120B may be separate information streams in the same communication link 120 or may be merged in the same data stream, depending on the particular application. In an alternative embodiment, control channel 120B may employ short message service (SMS) protocol to transmit control information between communication devices 105 and 110.

A loudspeaker 125 (SPKR) and microphone 130 (MIC) couple to communication hardware 115 to provide a multiple participant speaker-phone capability to communication device 105. Communication device 105 thus includes a multi-participant mode. A handset 135 couples to communication hardware 115 to provide a private handset capability to communication device 105. Communication device 105 thus includes a single participant or private mode.

Communication device 105 includes an audio manager 140 that may be implemented as hardware, firmware or software, as desired. In one embodiment, audio manager 140 communicates with a graphical user interface (GUI 300) that enables the user to interact with communication device 105. Audio manager 140 also communicates with a profile 150 that stores configuration information such as preferences, settings and/or attributes for audio manager 140. Profile 150 stores the local mode, namely whether local communication device 150 is currently in multi-participant mode or single participant/private mode. Profile 150 also stores the remote mode of each communication device that may communicate with local communication device 105. For example, profile 150 stores the mode of remote communication device 110, i.e. whether communication device 110 is currently set to multi-participant mode or single participant mode. Profile 150 further stores an accept/deny setting that specifies whether local communication device 105 will accept requests for mode change from other communication devices such as remote communication device 110.

In a manner similar to local communication device 105, remote communication device 110 includes communication hardware 115', loudspeaker 125', microphone 130', handset 135', audio manager 140', GUI 300' and a profile 150'. Profile 150' stores the configuration information of remote communication device 110 that controls how remote communication device 110 responds to requests for mode change from local communication device 105. The designation of local and remote is relative. For example, for discussion purposes, communication device 105 is designated the local communication device and communication device 110 is designated the remote communication device. However, from the perspective of communication device 110, communication device 105 is remote with respect to communication device 110.

Figure 2:
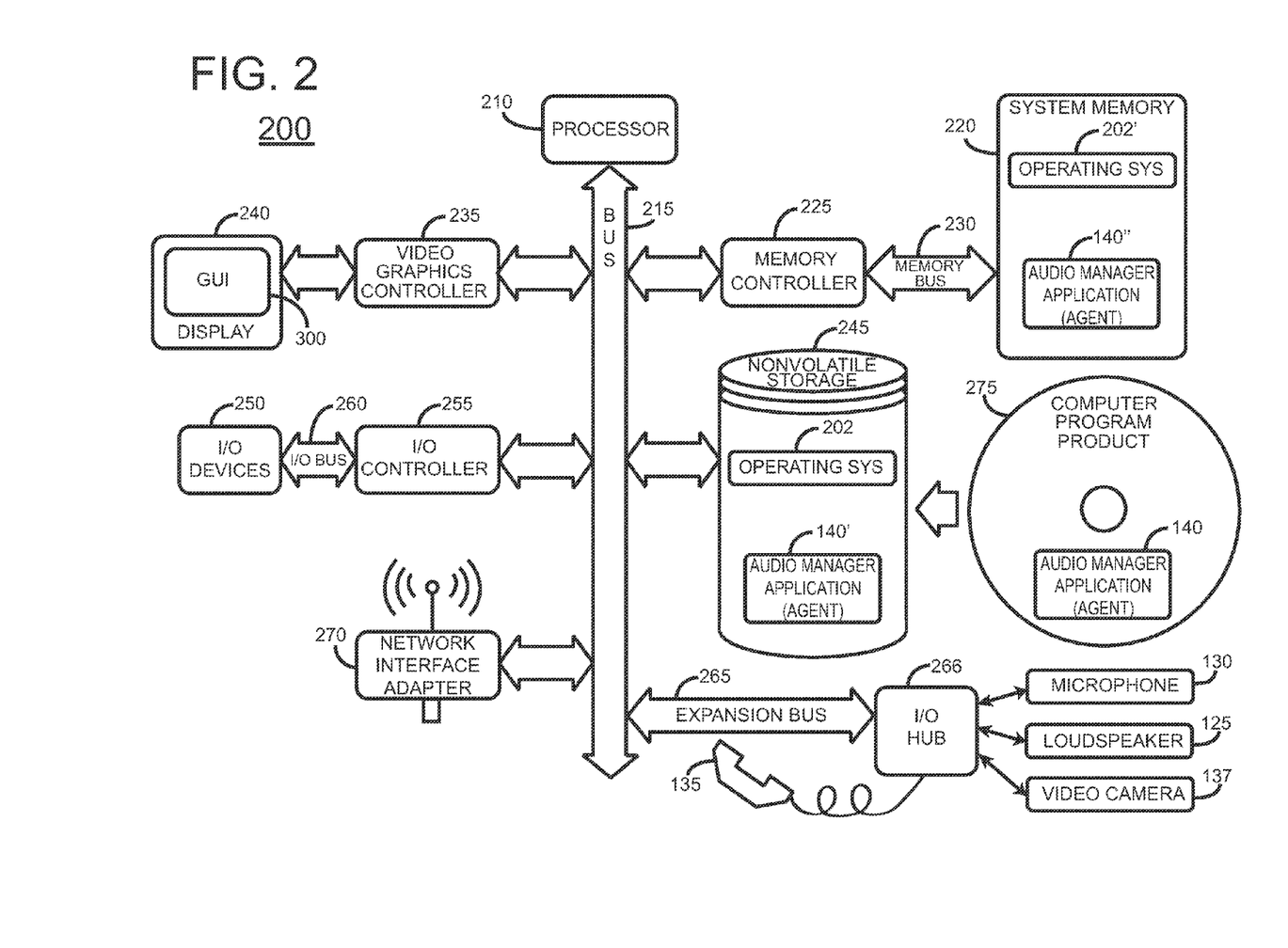
FIG. 2 is a block diagram of a representative IHS that may be used as audio communication devices in the disclosed system with audio manager.

FIG. 2 is a block diagram of an information handling system (IHS) 200 that may be used as local communication device 105 that includes an audio manager application 140. IHS 200 may also be used as remote communication device 110. IHS 200 includes a processor 210 that may include multiple cores. IHS 200 processes, transfers, communicates, modifies, stores or otherwise handles information in digital form, analog form or other form. IHS 200 includes a bus 215 that couples processor 210 to system memory 220 via a memory controller 225 and memory bus 230. In one embodiment, system memory 220 is external to processor 210. System memory 220 may be a static random access memory (SRAM) array or a dynamic random access memory (DRAM) array. Processor 210 may also include local memory (not shown) such as L1 and L2 caches (not shown). A video graphics controller 235 couples display 240 to bus 215. IHS 200 presents a graphical user interface (GUI) 300 to the user on display 240. Nonvolatile storage 245, such as a hard disk drive, CD drive, DVD drive, or other nonvolatile storage couples to bus 215 to provide IHS 200 with permanent storage of information. I/O devices 250, such as a keyboard and a mouse pointing device, couple to bus 215 via I/O controller 255 and I/O bus 260.

One or more expansion busses 265, such as USB, IEEE 1394 bus, ATA, SATA, PCI, PCIE, DVI, HDMI and other busses, couple to bus 215 to facilitate the connection of peripherals and devices to IHS 200. An input/output hub 266, such as a USB hub, couples to expansion bus 265 to couple loudspeaker 125, microphone 130, handset 135 and an optional video camera 137 to bus 115. A network interface adapter 270 couples to bus 215 to enable IHS 200, acting as a local communication device, to connect by wire or wirelessly to other IHSs such as remote communication device 110. In this embodiment, network interface adapter 270 may also be called a network communication adapter, a network adapter, or communication hardware. While FIG. 2 shows one IHS that employs processor 210, the IHS may take many forms. For example, IHS 200 may take the form of a desktop, server, portable, laptop, notebook, netbook, tablet or other form factor computer or data processing system. IHS 200 may take still other form factors such as a gaming device, a personal digital assistant (PDA), a portable telephone device, a communication device or other devices that include a processor and memory.

IHS 200 includes a computer program product, namely audio manager application 140, on digital media 275 such as a CD, DVD or other media. In one embodiment, a designer, user or other entity installs audio manager application 140 on nonvolatile storage 245 to practice the disclosed audio manager methodology. In practice, IHS 200 may store an operating system 202 (OPERATING SYS) and audio manager application 140 on nonvolatile storage 245 as operating system 202 and audio manager application 140', respectively. When IHS 200 initializes, the IHS loads operating system 202' into system memory 220 for execution as operating system 202'. IHS 200 also loads audio manager application 140' into system memory 220 as audio manager application 140".

As will be appreciated by one skilled in the art, aspects of the disclosed audio manager methodology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product, such as computer program product 275 embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the FIGS. 4-5 flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts of FIGS. 4-5 and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 4:
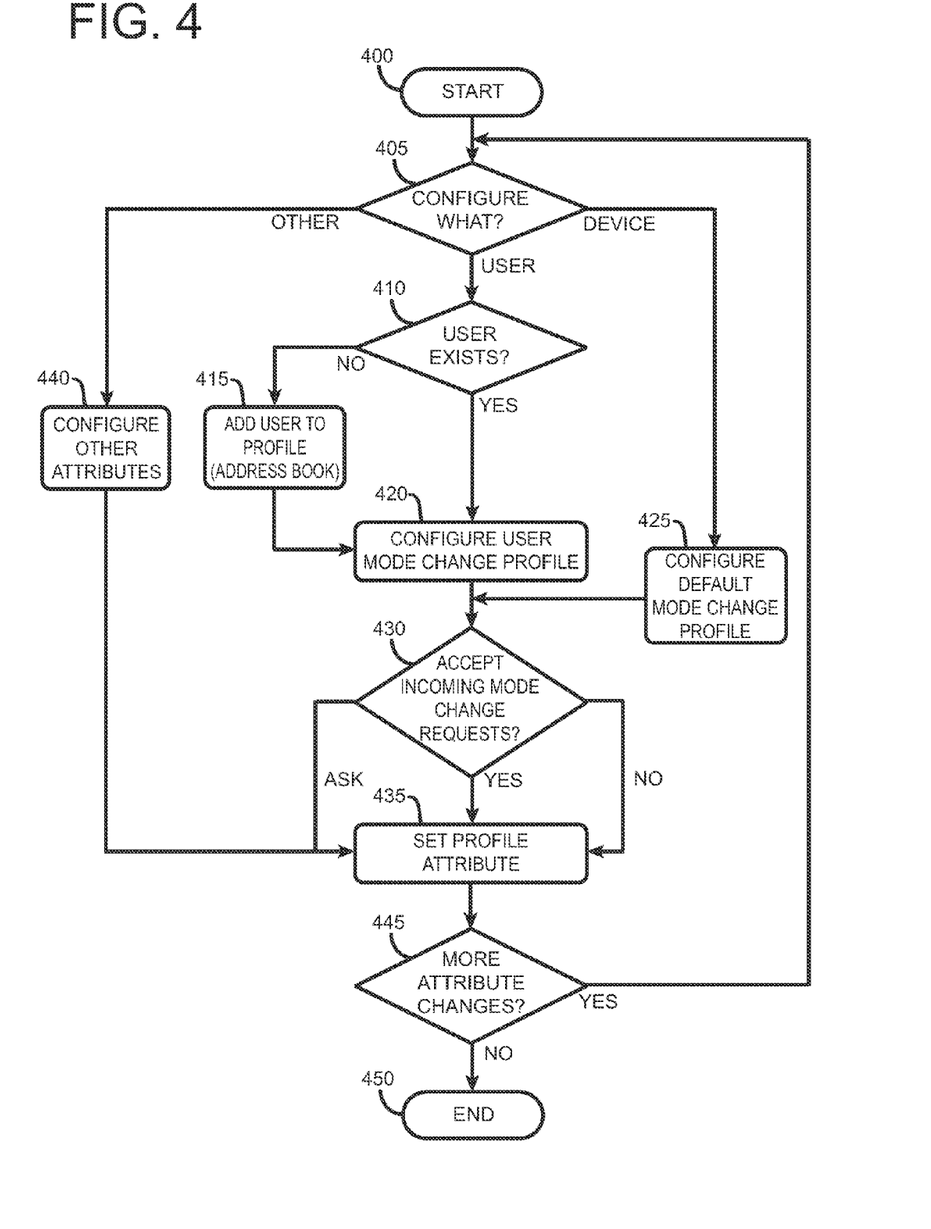
FIG. 4 is a flowchart that illustrates the configuration of a user profile for the disclosed audio manager.
Figure 5:
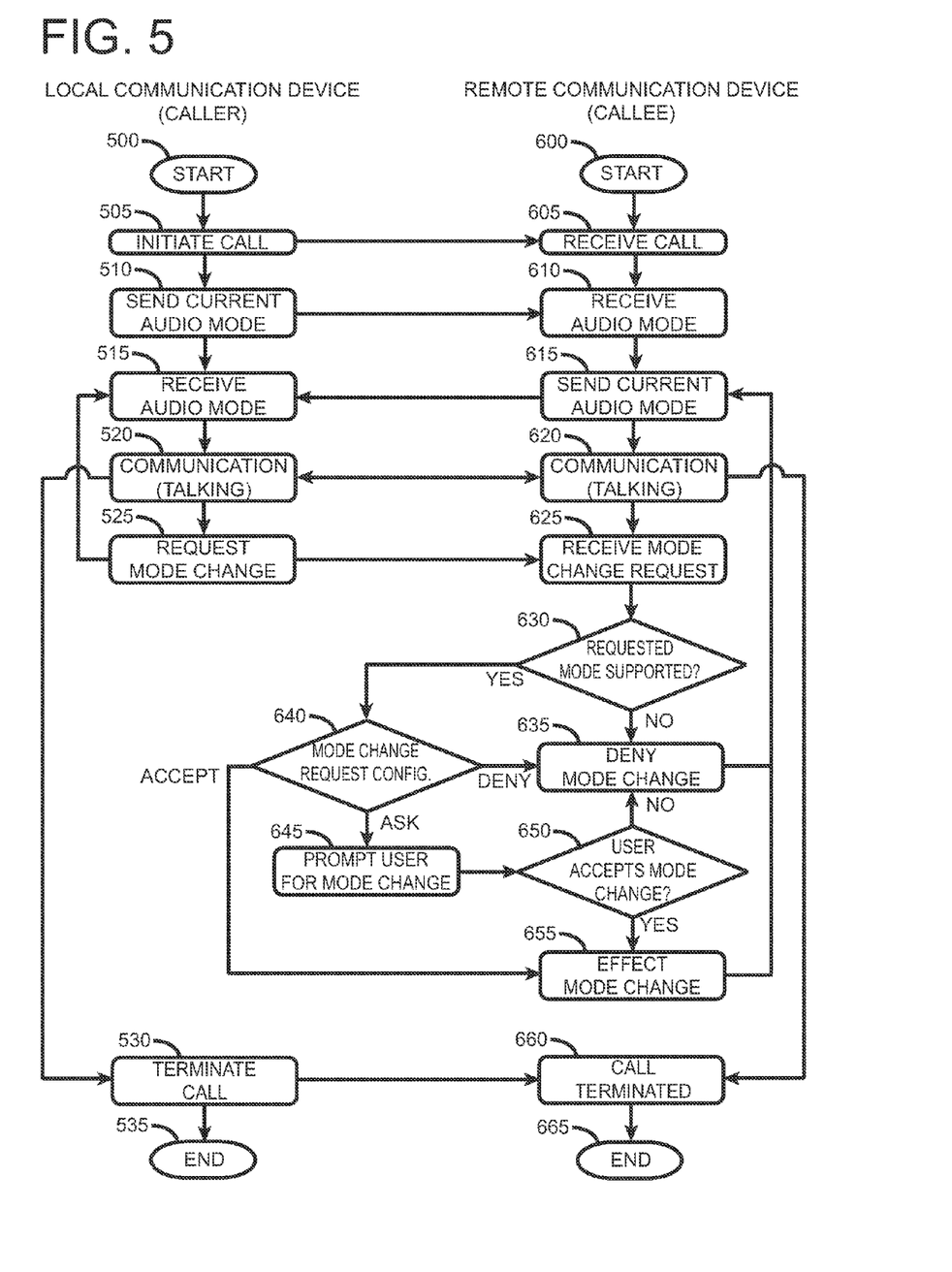
FIG. 5 is a flowchart that shows process flow in communication devices at the local-end and far-end of a communication link using the disclosed audio manager methodology.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts of FIGS. 4-5 described below.

The flowcharts FIGS. 4-5 illustrate the architecture, functionality, and operation of possible implementations of systems, methods and computer program products that perform network analysis in accordance with various embodiments of the present invention. In this regard, each block in the flowcharts of FIGS. 4-5 may represent a module, segment, or portion of code, which comprises one or more executable instructions for implementing the specified logical function(s). It should also be noted that, in some alternative implementations, the functions noted in the block may occur out of the order noted in FIGS. 4-5. For example, two blocks shown in succession may, in fact, be executed substantially concurrently, or the blocks may sometimes be executed in the reverse order, depending upon the functionality involved. It will also be noted that each block of FIGS. 4-5 and combinations of blocks in the block diagrams and/or flowchart illustration, can be implemented by special purpose hardware-based systems that perform the specified functions or acts, or combinations of special purpose hardware and computer instructions.

Figure 3:
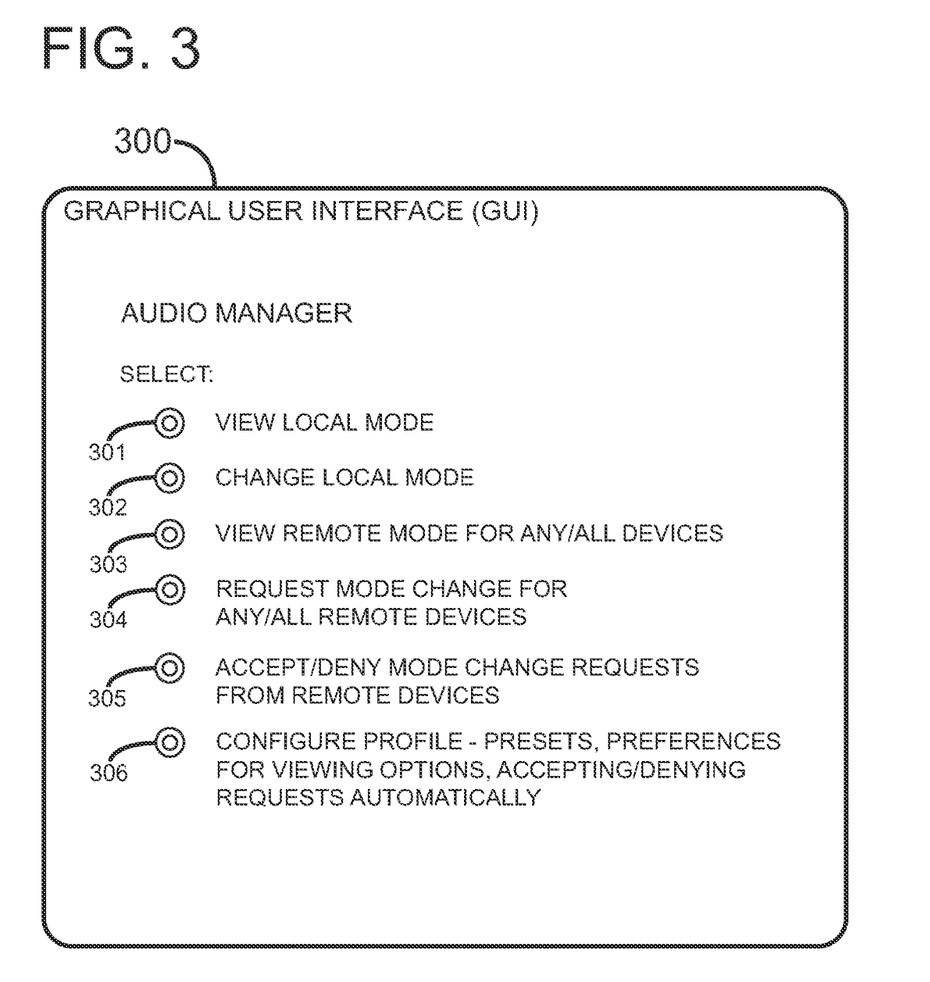
FIG. 3 is representation of a graphical user interface (GUI) that the disclosed audio manager may employ.

FIG. 3 is a representation of a graphical user interface (GUI) 300 that audio manager 140 instructs display 240 to present to the user. GUI 300 provides a convenient way for the user to configure audio manager 140 with a profile 150 that stores selected presets, preferences and attributes to govern the operation of audio manager 140 and communication device 105. In this particular embodiment, GUI 300 includes 6 radio buttons, 301-306, that enable the user to select 6 respective functions. If the user selects radio button 301 by clicking on radio button 301 with a pointing device such as a mouse, this action instructs audio manager 140 to display the current local mode on GUI 300. In response, GUI 300 displays "local mode=multi-participant mode" if local communication device 105 is currently in the multi-participant mode. Alternatively, GUI 300 displays "local mode=single participant/private" mode if local communication device 105 is currently in the more private single participant mode. Whether local communication device 105 is in multi-participant mode or single participant mode depends on the particular settings that the user of communication device 105 configures for communication device 105. As will be explained in more detail below, the current mode of local communication device 105 may also depend on a mode change request that local communication device 105 may receive from remote communication device 110. Likewise, the current mode of remote communication device 110 will depend on its configured settings and on whether or not remote communication device 110 has received and responded to a mode change request from local communication device 105.

To change the current mode of communication device 105, the user selects "change local mode" radio button 302. In response, GUI 300 presents a screen (not shown) wherein the user may select either single participant/private mode wherein communication device 105 engages the handset or multi-participant mode wherein communication device 105 activates the speaker and microphone for use by multiple users. In actual practice, selecting "change local mode" button 302 may instruct audio manager to display a screen (not shown) that includes a menu from which the user may select either multi-participant mode or single participant mode.

The user may select "view remote mode for any/all devices" radio button 303 to view the respective current modes of other remote communication devices such as remote communication device 110, for example. To request a mode change for a particular remote communication device 110, the user may select the "request mode change for any/all remote devices" radio button 304. So doing causes GUI 300 to display another screen (not shown) that provides the user with a list of remote communication devices and a respective option for each remote communication device to request a mode change for the respective device. The user may elect to request either multi-participant mode or single user mode on a remote communication device by remote communication device basis.

To accept or deny a particular received mode change request, the user of the particular communication device receiving the request may select the "accept/deny mode change requests from remote devices" radio button 305. In response, GUI 300 displays an accept/deny screen (not shown) wherein the user makes the desired accept/deny selection. If the user selects the "deny" option, then the communication device receiving the mode change request denies the mode change and maintains its current mode, whether it be multi-participant mode or single participant mode. If the user elects the "accept" option, then the communication device receiving the mode change request accepts the mode change and changes its current mode to the mode that the mode change requests.

The user of a communication device may also select "configure profile" radio button 306 to set preferences for accepting/denying mode change requests automatically without asking the user for each received mode change request, and to configure viewing options and other attributes or preferences. More particularly, when the user of local communication device 105 selects "configure profile" radio button 306, GUI 300 presents the user with a choice to select accepting/denying requests automatically. In more detail, the user may select the option to accept all requests for mode change automatically. Alternatively, the user of the local communication device may select the option to accept mode change requests on a remote participant by remote participant basis or a remote communication device by remote communication device basis. In those cases, the local communication device does automatically accept mode change requests from particular remote participants or particular remote communication devices. However, the user of the local communication device 105 may elect to deny mode change requests automatically on a remote participant by remote participant basis, or by a remote communication device by remote communication device basis. In that scenario, the local communication device responds to the designated mode change requests by denying such requests automatically without querying the user of local communication device 105 for each received mode change request. Profile 150 stores all of the above described configuration information, preferences and settings.

FIG. 4 is a flowchart that provides additional detail with respect to the configuration of settings and preferences in profile 150 for audio manager 140 of local communication device 105. Configuration process flow commences at start block 400. The user of communication device 105 enters configuration mode. Audio manager 140 instructs GUI 300 to present a choice to the user to "configure what", as per decision block 405. The user may select 1) configure communication device, 2) configure user, or 3) configure another attribute (other). If the user selects "device" at decision block 405, this indicates that the user elects to configure a default mode change profile for the communication device on a "per device" basis. For example, at block 425, the user may set the default mode change profile for local communication device 105 to globally deny mode change requests or globally accept mode change requests from remote communication devices such as remote communication device 110 without querying the user with respect to each mode change request.

Local communication device 105 also may employ more granular preferences for accepting or denying mode change requests. More specifically, in one embodiment, local communication device 105 offers individual users of local communication device 105 a choice of automatically accepting mode change requests, automatically denying mode change requests, or asking users to accept or deny each request on a per user basis. More specifically, decision block 405 asks to "configure what?". If the user selects the configure "user" option at decision block 405, then local communication device 105 performs a test to determine if the particular user exists in profile 150 or an associated address book thereof. In other words, audio manager 140 determines if profile 150 in local communication device 105 already includes an entry for the particular user, as per decision block 410. If the user does not already exist as an entry in profile 150, then audio manager 140 adds the user to profile 150, as per block 415. The audio manager 140 proceeds to configure user mode change profile 150, as per block 420. If the user already exists, then process flow continues from decision block 410 directly to configure profile block 420.

The user may elect to accept incoming mode change requests received by a local communication device, as per decision block 430. If the user selects "NO", i.e. to not accept incoming mode change requests from remote communication devices automatically without user intervention, then audio manager 140 sets the "accept incoming mode change requests" attribute to "NO", as per block 435. If the user selects "YES", i.e. to accept incoming mode change requests from remote communication devices automatically without user intervention, then audio manager 140 sets the "accept incoming mode change requests" attribute to "YES", again as per block 435. However, if the user of the local communication device selects "ASK", i.e. to have audio manager 140 ask the user to accept or deny each mode change request from a remote communication device, then audio manager 140 sets the "accept incoming mode change requests" attribute to "ASK", as per block 435.

After setting the "accept incoming mode change request" attribute, audio manager 140 queries the user via GUI 300 to determine if the user desires to change any other attributes, as per decision block 445. Examples of other attributes that the user may change include ring tone, screen or display background, and display brightness. User specific attribute settings include classifying an entry as "business" or "personal". If the user indicates at decision block 445 that there are more attributes desired for change, then process flow continues back to "configure what" decision block 405 where the user may select "other attributes". The user may then input a desired value for such other attribute, as per block 440, and that attribute becomes set in profile 150, as per block 435. However, if at decision block 445 the user indicates that there are no more attributes to be changed, then process flow ends at end block 450. Profile configuration is now complete.

FIG. 5 is an enhanced flowchart that describes overall process flow when local communication device 105 engages in communication with remote communication device 110, each communication device being controlled by their respective audio managers 140 and 140'. In the scenario depicted in FIG. 5, local communication device 105 will request that remote communication device 110 performs a mode change. The flowchart of FIG. 5 shows process steps that local communication device 105 performs generally on the left side of the flowchart, while showing process steps that remote communication device 110 performs generally on the right side and middle of the flowchart.

Process flow at local communication device 105 commences at start block 500. Process flow at remote communication device 110 commences at start block 600. The user (caller) at remote communication device 105 initiates a call, as per block 505, to the user (callee) of remote communication device 110, as per block 605. At remote communication device 110, there may be multiple participants including the user assigned to that remote communication device. The arrow from the initiate call block 505 to receive call box 605 indicates that the local communication device 105 is calling the remote communication device 110. After initiating the call, local communication device 105 sends its current audio mode (e.g. multi-participant mode or single participant/private mode) to remote communication device 110, as per block 510. Remote communication device 110 receives this audio mode type, as per block 610. In a similar manner, remote communication device 110 sends its current audio mode to local communication device 105, as per block 615. Local communication device 105 receives this audio mode type, as per block 515. The users or participants at local communication device 105 start communicating with the users or participants at remote communication device 110, as per block 520. Likewise, the users or participants at the remote communication device 110 start communicating with users or participants at local communication device 105, as per block 620.

Local communication device 105 sends a mode change request to remote communication device 110, as per block 525. Remote communication device 110 receives the mode change request, as per block 625. Remote communication device 110 performs a test to determine if device 110 supports the particular requested mode change. In other words, is remote communication device 110 capable of changing from a multi-participant mode to a single participant/private mode (or vice-versa). For example, audio manager 140' may check to determine if remote communication device 110 has a working handset 135' available for private communication. If remote communication device 110 does not support the particular requested mode change, then remote communication device 110 denies the requested mode change, as per block 635. Process flow then continues back to block 615 and remote communication device 110 sends its current audio mode to local communication device 105. However, if decision block 630 determines that the requested mode is supported, then the audio manager 140' of remote communication device 110 accesses profile 150' to determine if it is set to ACCEPT (yes), ASK or DENY (no), as per decision block 640.

If the profile is set to DENY, then audio manager 140' denies the mode change request at block 635 and process flow continues back to send current audio mode block 615. If the profile is set to ACCEPT, then audio manager 140' changes the mode to the requested mode, as per block 655, and process flow again continues back to send current audio mode block 615. If, however, the profile is set to ASK, then audio manager 140' queries the user of remote communication device 110 to ask for the user's consent to the mode change, as per block 645. If the user inputs a user selection to GUI 300' indicating the user's consent to the mode change at decision block 650, then audio manager 140' performs the mode change in remote communication device 110, as per block 655. Process flow then continues back to send current audio mode block 615. However, if the user does not accept the mode change, then audio manager 140' causes remote communication device 110 to deny the mode change and maintain the current mode, as per block 635. Process flow then continues back to send current audio mode block 615.

At some point in time, the user of local communication device 105 terminates the call, as per block 530, and the call ends at end block 535. Alternatively, the user of remote communication device 110 may terminate the call, as per block 660, and the call ends at end block 665.

As will be appreciated by one skilled in the art, aspects of the disclosed memory management technology may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of communicating information, comprising:
storing, by a first communication device, a first profile including a respective user-selected profile attribute for each of multiple users of the first communication device to control responses of the first communication device to mode change requests on a per user basis, the first communication device being capable of switching between a multiple user communication mode and a single user private mode in response to a mode change request;
storing, by a second communication device, a second profile including a respective user-selected profile attribute for each of multiple users of the second communication device to control responses of the second communication device to the mode change requests on a per user basis, the first and second communication devices being remote from one another, the second communication device being capable of switching between a multiple user communication mode and a single user private mode in response to the mode change request, the second communication device exhibiting a current mode that is one of the multiple user communication mode and the single user private mode of the second communication device;

transmitting, by the first communication device, audio information and the mode change request to the second communication device, the mode change request being designated to a particular user of the multiple users of the second communication device;

receiving, by the second communication device, the audio information and the mode change request;

switching, by the second communication device, from the multiple user mode to the single user private mode, in response to the mode change request if permitted by the respective user-selected profile attribute of the particular user in the second profile of the second communication device;

denying a mode change between the multiple user communication mode and the single user private mode, by the second communication device, in response to the mode change request if the respective user-selected profile attribute of the particular user in the second profile of the second communication device does not permit the mode change; and asking the particular user of the second communication device to allow the mode change between the multiple user communication mode and the single-user private mode, by the second communication device, in response to the mode change request if the respective user-selected profile attribute of the particular user in the second profile of the second communication device specifies that the particular user should be asked before allowing the mode change.

2. The method of claim 1, further comprising providing respective default profiles for use by the first and second communication devices if respective users do not select profile attributes, the respective default profiles being applicable to the first and second communication devices on a per device basis.

3. A communication system, comprising:
a first communication device that stores a first profile including a respective user-selected profile attribute for each of multiple users of the first communication device to control responses of the first communication device to mode change requests on a per user basis, the first communication device being capable of switching between a multiple user communication mode and a single user private mode in response to a mode change request;

a second communication device that stores a second profile including a respective user-selected profile attribute for each of multiple users of the second communication device to control responses of the second communication device to the mode change requests on a per user basis, the first and second communication devices being remote from one another, the second communication device being capable of switching between a multiple user communication mode and a single user private mode in response to the mode change request from the first communication device, the second communication device exhibiting a current mode that is one of the multiple user communication mode and the single user private mode of the second communication device;

wherein the first communication device transmits audio information and the mode change request to the second communication device, the mode change request being designated to a particular user of the multiple users of the second communication device;

wherein the second communication device receives audio information and the mode change request, wherein the second communication device switches from the multiple user mode to the single user private mode in response to the mode change request if permitted by the respective user-selected profile attribute of the particular user in the second profile of the second communication device;

wherein the second communication device denies a mode change between the multiple user communication mode and the single user private mode in response to the mode change request if the respective user-selected profile attribute of the particular user in the second profile of the second communication device does not permit the mode change; and wherein the second communication device asks the particular user of the second communication device to allow the mode change between the multiple user communication mode and the single user private mode in response to the mode change request if the respective user-selected profile attribute of the particular user in the second profile of the second communication device specifies that the particular user should be asked before allowing the mode change.

4. The communication system of claim 3, wherein the first and second communication devices include respective default profiles for use by the first and second communication devices if respective users do not select profile attributes, the respective default profiles being applicable to the first and second communication devices on a per device basis.

5. A computer program product, comprising:
a non-transitory computer readable storage medium having computer executable program instructions;

first program instructions that store in a first communication device a first profile including a respective user-selected profile attribute for each of multiple users of the first communication device to control responses of the first communication device to mode change requests on a per user basis, the first communication device being capable of switching between a multiple user communication mode and a single user private mode in response to a mode change request;

second program instructions that store in a second communication device a second profile including a respective user-selected profile attribute for each of multiple users of the second communication device to control responses of the second communication device to the mode change requests on a per user basis, the first and second communication devices being remote from one another, the second communication device being capable of switching between a multiple user communication mode and a single user private mode in response to the mode change request from the first communication device, the second communication device exhibiting a current mode that is one of the multiple user communication mode and the single user private mode of the second communication device;

wherein the first communication device includes third program instructions that transmit audio information and the mode change request to the second communication device, the mode change request being designated to a particular user of the multiple users of the second communication device;

wherein the second communication device includes fourth program instructions that receive audio information and the mode change request, wherein the second communication device switches from the multiple user mode to the single user private mode in response to the mode change request if permitted by the respective user-selected profile attribute of the particular user in the second profile of the second communication device;

wherein the second communication device includes fifth program instructions that instruct the second communication device to deny a mode change between the multiple user communication mode and the single user private mode in response to the mode change request if the respective user-selected profile attribute of the particular user in the second profile of the second communication device does not permit the mode change;

wherein the second communication device includes sixth program instructions that ask the particular user of the second communication device to allow the mode change between the multiple user communication mode and the single user private mode in response to the mode change request if the respective user-selected profile attribute of the particular user in the second profile of the second communication device specifies that the particular user should be asked before allowing the mode change; and wherein the first, second, third, fourth, fifth and sixth program instructions are stored on the non-transitory computer readable storage medium.

6. The computer program product of claim 5, further comprising seventh program instructions that include respective default profiles in the first and second communication devices for use by the first and second communication devices if respective users do not select profile attributes, the respective default profiles being applicable to the first and second communication devices on a per device basis.

\* \* \* \* \*